Figure 1:
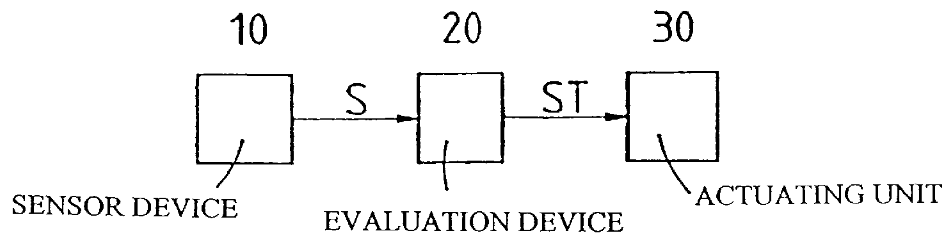

US005969493A

United States Patent [19]

Pientka et al.

[11] Patent Number: 5,969,493

[45] Date of Patent: Oct. 19, 1999

[54] DEVICE FOR OPERATING A WINDSCREEN WIPER

[75] Inventors: Rainer Pientka, Achern; Henry Blitzke, Buehl; Joerg Buerkle, Offenburg, all of Germany

[73] Assignee: Robert Bosch GmbH, Stuttgart, Germany

[21] Appl. No.: 08/945,540

[22] PCT Filed: Apr. 16, 1996

[86] PCT No.: PCT/DE96/00658

§ 371 Date: Oct. 2, 1997

§ 102(e) Date: Oct. 2, 1997

[87] PCT Pub. No.: WO96/37387

PCT Pub. Date: Nov. 28, 1996

[30] Foreign Application Priority Data

May 27, 1995 [DE] Germany .......................... 195 19 502

[51] Int. Cl.[6] ........................ B60S 1/08

[52] U.S. Cl. .................... 318/483; 318/444; 318/DIG. 2

[58] Field of Search .................... 318/443, 444, 318/483, DIG. 2; 15/250.17, DIG. 15

[56] References Cited

U.S. PATENT DOCUMENTS 5,140,233 8/1992 Wallrafen ................................ 318/264
5,319,293 6/1994 Levers ................................ 318/483
5,684,464 11/1997 Egger ................................ 318/444 X
5,760,559 6/1998 Pientka et al. ......................... 318/483

FOREIGN PATENT DOCUMENTS 3314770 10/1984 Germany .

*Primary Examiner*—Bentsu Ro
*Attorney, Agent, or Firm*—Venable; George H. Spencer; Ashley J. Wells

[57] ABSTRACT

The invention relates to an apparatus for operating a windshield wiper, having a sensor device for detecting the state of wetness of a windshield, an evaluation device that receives the sensor signal and an actuating unit for the windshield wiper that can be actuated by the evaluation device to effect suitable wiping operation. Even when individual drops impact the windshield, appropriate wiping operation can be initiated during a drying phase of the windshield, because it is provided that current measured values of the sensor signal can be supplied to both the difference-initiating stage and a drop-recognition device that is provided in the evaluation device and in which the sensor signal can be evaluated with respect to individual drops using signal breaks, and that an adapted control signal can be generated by the control-signal-generating stage when a minimum signal break is detected, with which signal corresponding wiping operation can be initiated by way of the actuating unit.

7 Claims, 1 Drawing Sheet

DEVICE FOR OPERATING A WINDSCREEN WIPER

CROSS-REFERENCE TO RELATED APPLICATION

This application was filed as International Application PCT/DE96/00658 on Apr. 16, 1996, claiming the right of priority of Application No. 195 19 502.7 filed in Germany on May 27, 1995, under 35 USC 119. The national stage for the United States of America was entered on Oct. 2, 1997 under 35 USC 371.

STATE OF THE ART

The invention relates to an apparatus for operating a windshield wiper that has a sensor device for detecting the state of wetness of a windshield, an evaluation device that receives the sensor signal and has a signal-processing stage, a difference-initiating stage and a control-signal-generation stage, and an actuating unit for the windshield wiper, which can be actuated by the evaluation device to effect wiping operation.

This type of apparatus is known from DE 33 14 770 A1. In this known apparatus, wiping operation is initiated if a difference between a reference value and a current measured value of the sensor signal exceeds a predetermined threshold value. A difference of this type is formed, for example, if a certain number of raindrops reduces the intensity of the signal and it drops below the predetermined threshold value. In this case, wiping operation is frequently not initiated if only a few raindrops impact the windshield, although such occurrences of wetness on the windshield can be disturbing.

ADVANTAGES OF THE INVENTION

It is the object of the invention to refine an apparatus of the type mentioned at the outset such that wiping operation is better adapted to external conditions, increasing safety.

This object is accomplished with a generic apparatus having the features of claim 1.

Accordingly, it is provided that current measured values of the sensor signal can be supplied to both the difference-initiating stage and a drop-recognition device in the evaluation device, in which the sensor signal can be evaluated with respect to individual drops using signal breaks, and that when a minimum signal break is recognized, an adapted control signal can be generated by the control-signal-generation stage, with which signal a corresponding wiping operation can be initiated by way of the actuating unit.

With the additional drop-recognition device, occurrences of wetness on the windshield can also be detected that can be attributed to individual, larger drops, and the disturbing wetness can be eliminated by the windshield wiper.

The apparatus is advantageously configured such that the drop-recognition device operates even during periods during which the difference-initiating stage is switched to be inactive. An example of a case in which the difference-initiating stage is switched to be inactive is when the windshield is not completely clean after wiping, and the signal shows an increasing tendency due to residual moisture that is still present, or streaks caused by the relatively rapid drying process. In a normal case, no wiping process should be initiated. If drops impact the windshield during this time, they can be recognized by the drop-recognition device over the course of the sensor signal, because the drops cause a visible signal break, and a necessary wiping process can be initiated immediately in this situation.

A further advantageous embodiment of the apparatus provides that the signal breaks can be detected in the drop-recognition device through the determination of the difference between a current measured value and a reference value. Existing signal breaks can consequently be ascertained, and the drop-recognition device can be activated for analysis of the cause of the signal break to distinguish between wetness and disturbance.

A reliable reference variable that also takes into consideration an increasing tendency of the sensor signal, for example, and is insensitive to instantaneous disturbances, is advantageously obtained through the formation of the reference variable from the mean value of a plurality of the last measured values preceding the current measured value. For example, the last four measured values can be used to form the mean value.

In the event that a signal break has been detected, a reliable evaluation with respect to the presence of drops can be effected in that the drop-recognition device has a surface-calculation stage, with which the surface between the reference variable and a plurality of sequential, current measured values (MW) can be determined if the difference between the current measured value and the reference value exceeds a predetermined reference value, and the signal break is evaluated as drops if the surface exceeds a predetermined minimum value. The surface offers a reliable evaluation criterion for the presence of drops.

If it is provided that the predetermined reference value for the difference and/or the predetermined minimum value of the surface is selected to be greater with greater mean values than with smaller mean values, an extensive insensitivity of the drop-recognition device of the signal level is achieved.

In contrast to the difference resolution, which is not activated, for example, if the signal exhibits an increasing tendency due to the drying residual moisture on the windshield, wiping operation can even be initiated in this situation, because it is provided that the drop-recognition device is also switched on if the sensor signal has an increasing tendency when residual moisture is drying on the windshield.

Figure 2:
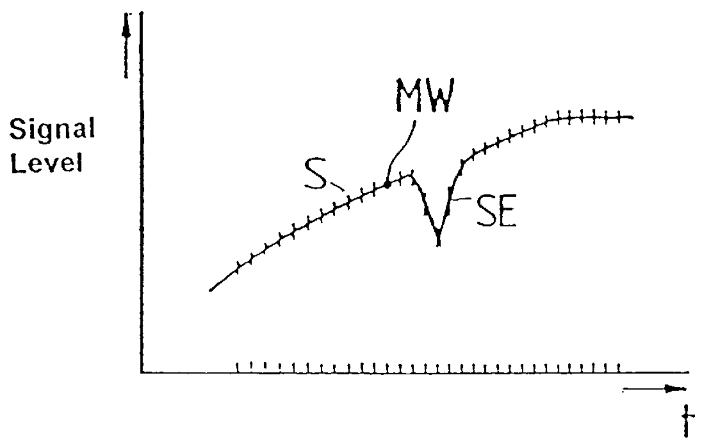
Figure 3:
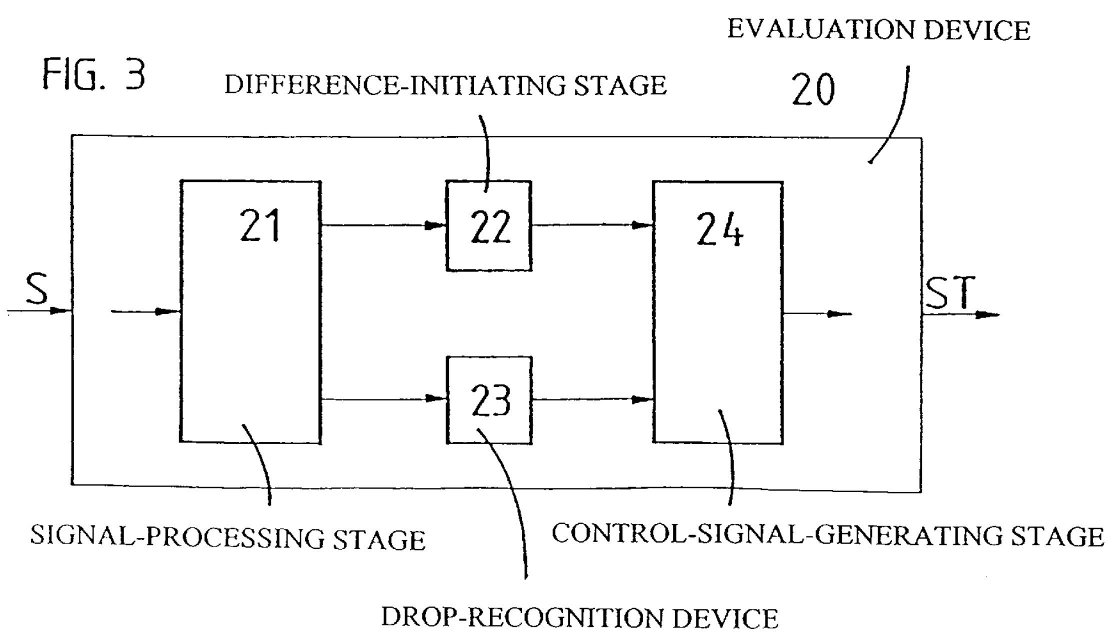

The invention is described in detail below by way of an embodiment, with reference to the drawings. Shown are in:

FIG. 1 a schematic block representation of an apparatus for operating a windshield wiper, FIG. 2 a course of a sensor signal over time, and FIG. 3 a more detailed embodiment of an evaluation device shown in FIG. 1.

FIG. 1 shows a block representation of an apparatus for operating a windshield wiper, the apparatus having a sensor device 10, which transmits a sensor signal S to an evaluation device 20. The evaluation device generates a control signal ST, with which wiping operation can be effected by way of an actuating unit 30.

FIG. 2 shows a course of the sensor signal S over time t. The sensor signal S has an increasing tendency, as can be observed, for example, during relatively rapid drying of residual moisture or when streaks are present on the windshield. Normally, wiping operation is prevented during this type of drying process, and a difference-initiating stage 22 that is usually present in the evaluation device 20 (FIG. 3) is switched to be inactive during this time. If an occurrence of wetness that causes a signal break SE takes place during this phase, wiping operation is not initiated directly, although drops falling onto the windshield cause a visual disturbance that is frequently not negligible. Even when the difference-initiating stage is active, signal breaks can be caused by individual, larger drops; these are, however, not sufficient to exceed a threshold value for a difference resolution, so even in this case wiping operation is not initiated immediately, although external conditions would necessitate wiping operation.

FIG. 3 schematically shows a detailed embodiment of the evaluation device 20, with which individual, disturbing drops or occurrences of wetness are reliably detected, and a control signal ST is generated for appropriate wiping operation.

In a signal-processing stage 21, measured values MW of the sensor signal S are obtained at relatively short intervals, for example every 5 ms, which are short enough to facilitate the detection of signal breaks caused by individual drops. The measured values can ordinarily be supplied to the difference-initiating stage 22 and, independently thereof, to a drop-recognition device 23, which ascertain occurrences of wetness and provide corresponding information to a control-signal-generating stage 24. In this stage, the control signal ST is generated when an occurrence of wetness necessitates a wiping process, and is further conveyed at the output of the evaluation device 20 to the actuating unit 30 for effecting wiping operation.

With the drop-recognition device 23, the current measured value is compared to the mean value of a plurality of the last measured values, for example four. A difference between the current measured value MW and the mean value is recognized as a signal break, with the current measured value MS being less than the mean value. If this difference exceeds a predetermined reference value, the mean value is stored as a reference variable. Consequently, the surface between the reference variable, as an imaginary horizontal line, and a few, for example three, of the subsequent current measured values is calculated. If this surface exceeds a predetermined minimum value, the signal break is evaluated as drops.

The predetermined reference value for the difference and the predetermined minimum value for the surface are preferably adapted to the present signal level of the measured values MW to assure that the sensitivity is extensively independent of the signal level. For example, the predetermined reference value is set to be constant at 4 increments beneath a specific incremental value of the signal level. Above the incremental mean value, this value is divided by a certain number, and the quotient is used as the difference. For example, three measurements are taken in sequence, and the surface must be at least one predetermined multiple of the calculated value. Then the signal break SE is recognized as drops. The drop-recognition device 23 then transmits corresponding information to the control-signal-generating stage 24 to generate a control signal ST for initiating wiping operation.

The apparatus for operating a windshield wiper is improved with the described measures such that appropriate wiping operation is assured at all times when drops impact the windshield.

We claim:

1. Apparatus for operating a windshield wiper, having a sensor device for detecting the state of wetness of a windshield, an evaluation device that receives the sensor signal and includes a signal-processing stage, a difference-initiating stage and a control-signal-generating stage, the apparatus further having an actuating unit for the windshield wiper that is actuated by the evaluation device to initiate wiping operation, characterized in that current measured values of the sensor signal (S) is supplied to both the difference-initiating stage (22) and a drop-recognition device (23) that is provided in the evaluation device (20) and in which the sensor signal (S) is evaluated with respect to individual drops using signal breaks (SE), and when a minimum signal break is recognized, an adapted control signal (ST) is generated by the control-signal-generation stage (24), with which signal corresponding wiping operation is initiated via the actuating unit (30).

2. Apparatus according to claim 1, characterized in that the drop-recognition device (23) is also in operation during times in which the difference-initiating stage (22) is switched to be inactive.

3. Apparatus according to claim 1, characterized in that the signal breaks (SE) are detected in the drop-recognition device (23) through the determination of the difference between a current measured value (MW) and a reference variable.

4. Apparatus according to claim 3, characterized in that the reference variable is formed from the mean value of a plurality of the last measured values preceding the current measured value (MW).

5. Apparatus according to claim 3, characterized in that the drop-recognition device (23) has a surface-calculation stage with which the surface between the reference variable and a plurality of sequential, current measured values (MW) are determined when the difference between the current measured value (MW) and the reference value exceeds a predetermined reference value, and a signal break is evaluated as drops when the surface exceeds a predetermined minimum value.

6. Apparatus according to claim 5, characterized in that the predetermined reference value for the difference, and/or the predetermined minimum value of the surface is or are selected to be greater with greater mean values than with lesser mean values.

7. Apparatus according to claim 1, characterized in that the drop-recognition device (23) is also switched on if the sensor signal (S) has an increasing tendency when residual moisture is drying on the windshield.

* * * * *